(12) United States Patent
Guimond et al.

(10) Patent No.: US 10,918,026 B2
(45) Date of Patent: Feb. 16, 2021

(54) OPTIMIZED STUMP HARVESTER

(71) Applicant: National Attachments Incorporated, Gorham, ME (US)

(72) Inventors: Alfred Scott Guimond, Raymond, ME (US); Alfred Scott Guimond, II, Steep Falls, ME (US)

(73) Assignee: National Attachments Incorporated, Gorham, ME (US)

( * ) Notice: Subject to any disclaimer, the term of this patent is extended or adjusted under 35 U.S.C. 154(b) by 218 days.

(21) Appl. No.: 15/944,364

(22) Filed: Apr. 3, 2018

(65) Prior Publication Data

US 2018/0303045 A1   Oct. 25, 2018

Related U.S. Application Data

(60) Provisional application No. 62/489,838, filed on Apr. 25, 2017.

(51) Int. Cl.
| | |
|---|---|
| *A01G 23/06* | (2006.01) |
| *B27L 7/06* | (2006.01) |
| *B66C 1/42* | (2006.01) |
| *E02F 3/96* | (2006.01) |
| *B27L 7/00* | (2006.01) |

(52) U.S. Cl.
CPC .............. *A01G 23/065* (2013.01); *B27L 7/00* (2013.01); *B27L 7/06* (2013.01); *B66C 1/42* (2013.01); *E02F 3/963* (2013.01); *E02F 3/965* (2013.01)

(58) Field of Classification Search
CPC .... A01G 23/06; A01G 23/062; A01G 23/065; E02F 3/963; E02F 3/965
See application file for complete search history.

(56) References Cited

U.S. PATENT DOCUMENTS

| | | | | |
|---|---|---|---|---|
| 2,979,215 | A * | 4/1961 | Brisson | E02F 3/342 414/553 |
| 3,250,028 | A * | 5/1966 | Hunger | E02F 3/404 37/406 |
| 4,908,946 | A * | 3/1990 | Labounty | A01G 23/087 144/339 |
| 5,080,151 | A * | 1/1992 | Pallari | A01G 23/067 144/24.12 |
| 5,114,299 | A * | 5/1992 | Roche | E02F 3/404 37/403 |

(Continued)

*Primary Examiner* — Jessica H Lutz
(74) *Attorney, Agent, or Firm* — James A. Sheridan; Sheridan Law, LLC

(57) ABSTRACT

There is disclosed a system and methods of use for quickly and efficiently excavating, cross-cutting, splitting, and loading or stockpiling tree stumpage and other tree or organic materials, as well as for performing ground cleanup operations. One embodiment provides a stump harvester for attachment to a distal end of an excavator arm. The stump harvester may include front and back jaw assemblies configured to pivot between open and closed positions. The back jaw assembly may include a knife arm having a cutting blade that extends along a majority of a front side of the knife arm. A centerline plane may bisect a cutting edge of the blade. The front jaw assembly may include a planar-aligned dual anvil configured to sheath the cutting edge of the blade when the front and the back jaw assemblies move into the closed position. Other embodiments are disclosed.

15 Claims, 12 Drawing Sheets

(56) References Cited

U.S. PATENT DOCUMENTS

| | | | | | |
|---|---|---|---|---|---|
| 5,172,951 | A | * | 12/1992 | Jacobsen | A61F 2/588 294/104 |
| 5,471,747 | A | * | 12/1995 | Morikawa | B23D 17/00 30/134 |
| 5,533,682 | A | * | 7/1996 | de Gier | B23D 17/00 241/101.73 |
| 5,671,892 | A | * | 9/1997 | Morikawa | B23D 17/00 241/101.73 |
| 5,921,302 | A | * | 7/1999 | Petersen | A01G 23/06 144/24.12 |
| 6,076,572 | A | * | 6/2000 | Cook | E02F 3/3604 144/24.12 |
| 9,382,689 | B2 | * | 7/2016 | Chapman | E02F 3/96 |
| 2005/0115638 | A1 | * | 6/2005 | Solesbee | E02F 3/404 144/4.1 |
| 2007/0130808 | A1 | * | 6/2007 | Peterson | E02F 3/965 37/406 |
| 2014/0150304 | A1 | * | 6/2014 | Sherlock | E02F 3/96 37/405 |
| 2018/0326425 | A1 | * | 11/2018 | Raihala | E04G 23/082 |
| 2019/0193084 | A1 | * | 6/2019 | Brouwers | B23D 35/002 |

* cited by examiner

OPTIMIZED STUMP HARVESTER

REFERENCE TO PENDING PRIOR PATENT APPLICATION

The application claims the benefit under 35 U.S.C. 119(e) of U.S. Provisional Patent application No. 62/489,838, filed Apr. 25, 2017 by Alfred Scott Guimond, Alfred Scott Guimond II, and Mark Nye for "OPTIMIZED STUMP HARVESTER," which patent application is hereby incorporated herein by reference.

BACKGROUND

A stump harvester is a tool that attaches to an end of an excavator arm in place of a conventional excavator bucket. A traditional harvester functions to accomplish one or more of excavating, ripping, and/or prying stumpage from the ground, removing extraneous dirt and rocks by shaking and/or dropping the stump to the ground, shearing or crosscutting the stump, splitting a log lengthwise, and manipulating and/or loading stumpage, pieces of stumpage, and/or other tree length materials.

Existing stump harvesters feature geometries that present a number of disadvantages and inefficiencies in accomplishing each the functions discussed above, resulting in a decreased ability to excavate, shake, split, and/or manipulate tree stumps and associated materials and/or a limited ability to multitask to perform all of the desired functions with a single tool, requiring multiple tools and/or accessories to perform the requisite tasks oftentimes necessary in tree, stump, and/or field clearing in preparation for industrial, transportation, or agricultural development.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a stump harvester for attachment to a distal end of an excavator arm. The stump harvester may include a front jaw assembly pivotally coupled with a back jaw assembly, the front and the back jaw assemblies configured to move between an open position in which the front and the back jaw assemblies are hinged apart and a closed position in which the front and the back jaw assemblies are hinged together, wherein: (1) the back jaw assembly comprises: (a) a knife arm having a front side facing the front jaw assembly, a back side facing opposite the front jaw assembly, a proximal end disposed adjacent to the excavator arm, and a distal end offset from the excavator arm; (b) a cutting blade disposed along the front side of the knife arm, the cutting blade terminating in a sharpened cutting edge; and (c) a back positive stop disposed adjacent the cutting blade at the distal end of the knife arm; (2) the front jaw assembly comprises: (a) a grubbing arm having a back side facing the back jaw assembly, a front side facing opposite the back jaw assembly, a proximal end disposed adjacent to the excavator arm, and a distal end offset from the excavator arm; (b) a dual anvil extending toward the back jaw assembly, the dual anvil comprising a first anvil wall separated from a second anvil wall by an anvil channel; and (c) a front positive stop protruding from the front side of the grubbing arm; (3) a centerline plane bisects the cutting edge and the anvil channel; and (4) the front and the back positive stops meet at the closed position in which the cutting edge is sheathed within the anvil channel.

Another embodiment provides a multi-purpose tool for attachment to an excavator arm. The multi-purpose tool may include a front jaw assembly pivotally coupled with a back jaw assembly. The front jaw assembly may include a grubbing arm having a front plate that connects left and right side plates, wherein the front, the left, and the right side plates each have a solid geometry. The back jaw assembly may include (1) a knife arm having a back side facing opposite the front jaw assembly and a front side facing the front jaw assembly, the knife arm extending from a proximal end adjacent to the excavator arm to a distal end offset from the excavator arm; and (2) a jointed cutting blade extending outward from the front side of the knife arm to a sharpened cutting edge having a dual-bevel cross-sectional geometry, wherein: (a) the jointed cutting blade comprises a proximal section abutting a distal section, the proximal section disposed at the proximal end of the knife arm and the distal section disposed at the distal end of the knife arm; and (b) the jointed cutting blade is disposed upon at least 70-90 percent of the front side of the knife arm between the proximal and the distal ends of the knife arm.

Yet another embodiment provides a method of operating a stump harvester having a front jaw assembly coupled with a back jaw assembly via a rotative coupling, wherein: (1) the front jaw assembly includes a grubbing arm, a front positive stop, a plurality of prying tines that extend outward from the grubbing arm toward the back jaw assembly, and a dual anvil having two opposing walls that extend outward from the grubbing arm toward the back jaw assembly, the two opposing walls separated by an anvil channel; (2) the back jaw assembly includes a knife arm, a back positive stop, a cutting blade having a cutting edge that extends outward from the knife arm toward the dual anvil, and a splitter fang that extends outward from a distal end of the knife arm toward the plurality of the prying tines; and (3) a centerline plane bisects the dual anvil channel, the plurality of the prying tines, the cutting edge, and the splitter fang. The he method may include the steps of (a) attaching the stump harvester to a distal end of an excavator arm; (b) actuating the rotative coupling to rotate the front and the back jaw assemblies into an open position in which the knife arm and the grubber arm are separated; (c) actuating the excavator arm to dispose the front and the back jaw assemblies about a tree stump; (d) actuating the rotative coupling to rotate the front and the back jaw assemblies toward a closed position until the front and the back jaw assemblies tighten about the tree stump; (e) actuating the excavator arm and the rotative coupling to excavate the tree stump from a ground surface; and (f) actuating the excavator arm to agitate the tree stump contained within the front and the back jaw assemblies to remove one or more foreign particles from the excavated tree stump.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to the effective removal/excavation of tree stumps, as well as the processing of tree stumpage, tree lengths, and/or other organic materials, including the removal of extraneous material(s) and debris from the stumpage, side-sweep grading and compacting the excavation site, cross-cutting/shearing the tree stump or tree length, axial log splitting lengthwise on the ground, and manipulating and loading or stockpiling stumpage, pieces of stumpage, and/or other tree length materials.

As discussed above in the Background section, existing stump harvester tools fail to provide effective geometries for accomplishing numerous stumpage, log, and/or tree material processing purposes with a single tool. For example, many existing stump harvester tools include cutting blades that are discrete in length and/or blunt edged. As a result, the harvester tool must be perfectly aligned with the material to be cut in order for the tool's blade to be effective. This can render the harvester ineffective or cause the harvester to require repetitive operator realignment before the discrete blade is properly positioned about the stump, log, or the tree length to be cut.

Many existing stump harvesters also lack a mechanism for lengthwise, axial log splitting, or if they include such a mechanism, the mechanism is inappropriately located and/or not designed for maximum efficacy. Other existing harvesters require replacement of the entire harvester once cutting blades and other components wear out, failing to provide options for component replacement and increased tool longevity.

Embodiments of an optimized stump harvester disclosed herein are geometrically designed to increase harvester productivity in a manner that enables the stump harvester to be properly aligned for consistent prying, excavating, cross-cutting, spitting, shaking, and/or otherwise manipulating and loading stump and/or other tree materials with minimized operator error and maximized control, all using a single multi-purpose tool. Various components of the optimized stump harvester may be formed from 150,000 PSI quenched and tempered alloy steels with hardened alloy pins and bushings throughout, providing reliable, high-strength performance.

Figure 1:
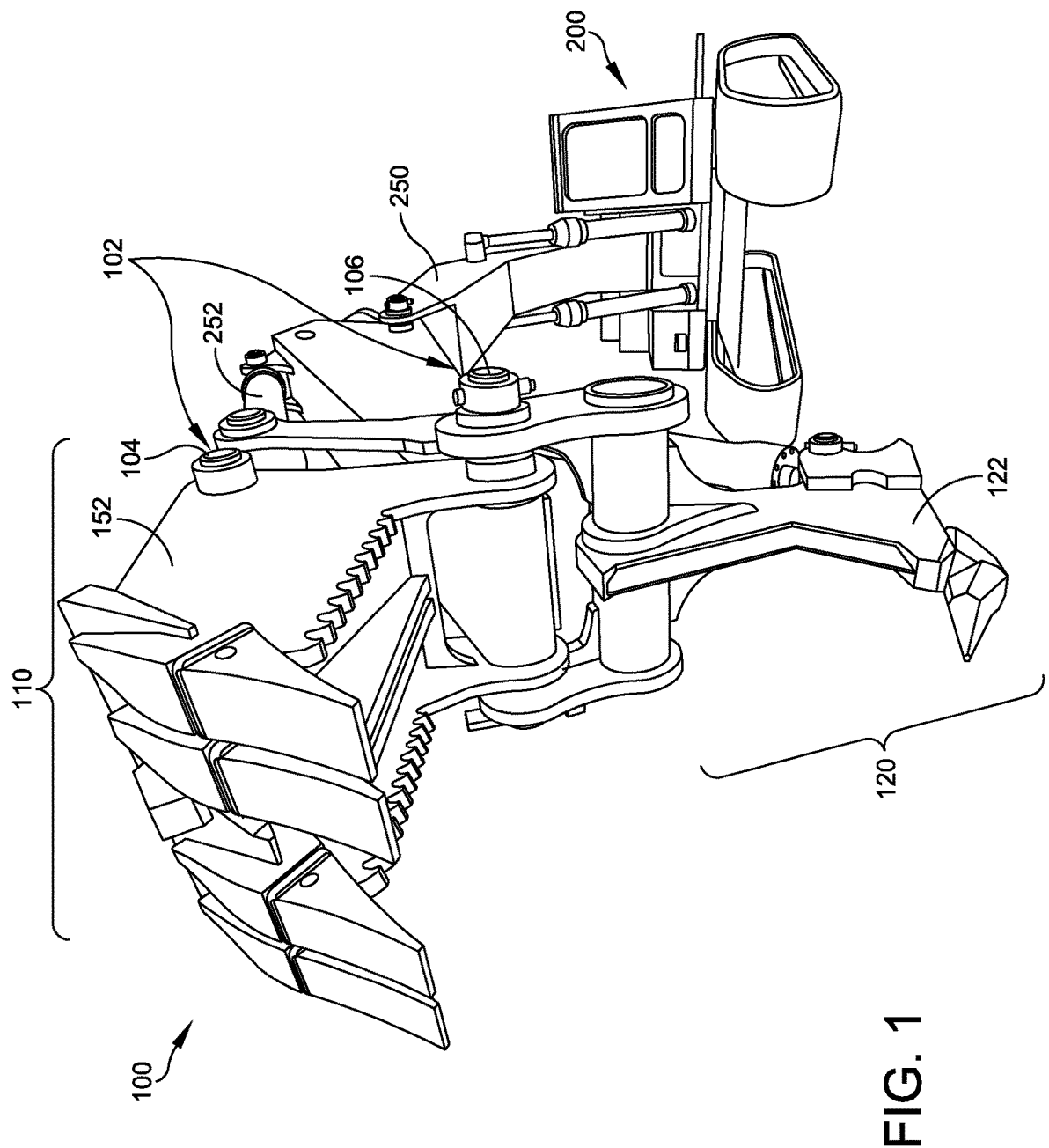
FIG. 1 illustrates a perspective view of one embodiment of an optimized stump harvester, as attached to an excavation arm of an excavator.

FIG. 1 illustrates a perspective view of one embodiment of an optimized stump harvester 100, as attached to a distal end of an excavator arm 250 of a heavy-equipment excavator 200. Embodiments of the stump harvester 100 may be configured in quick coupler or pin-grabber compatible attachment versions, depending on preference. In one embodiment, the stump harvester 100 includes a pin group 102 that enables a pin-grabber style coupling between the harvester 100 and the excavator arm 250, such that the operator may make tool changes (e.g., between the stump harvester 100 and a bucket, etc.) in minutes as opposed to hours, enabling a quick-change exchange between the harvester 100 and either a bucket or another type of tool mounting to the end of the excavator arm 250. The pin group 102 may be formed of first and second heat treated alloy pins 104, 106 within super hard alloy bushings to ensure long-term quick-change versatility.

Figure 2:
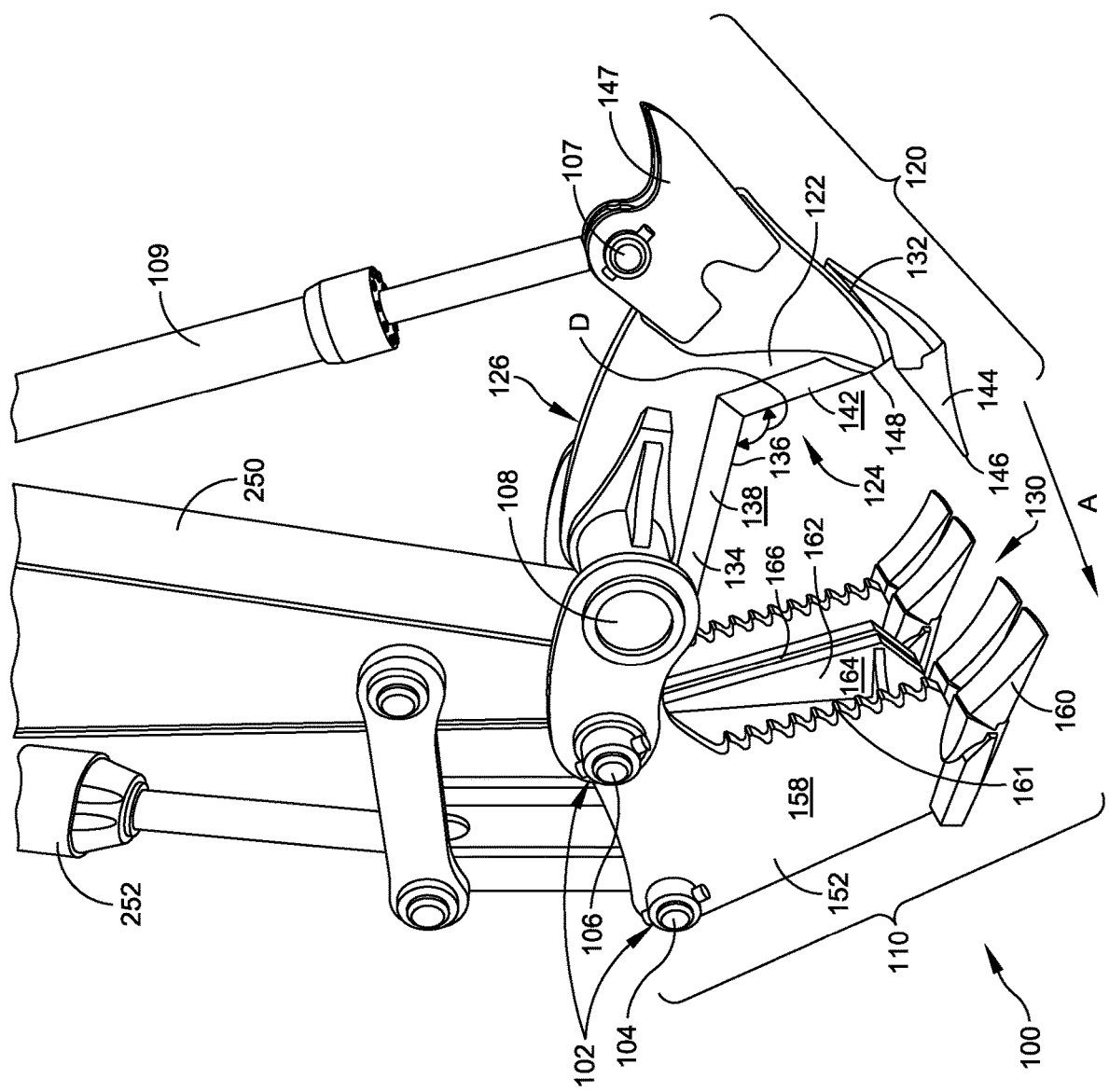
FIG. 2 illustrates a left perspective view of the stump harvester of FIG. 1.
Figure 3:
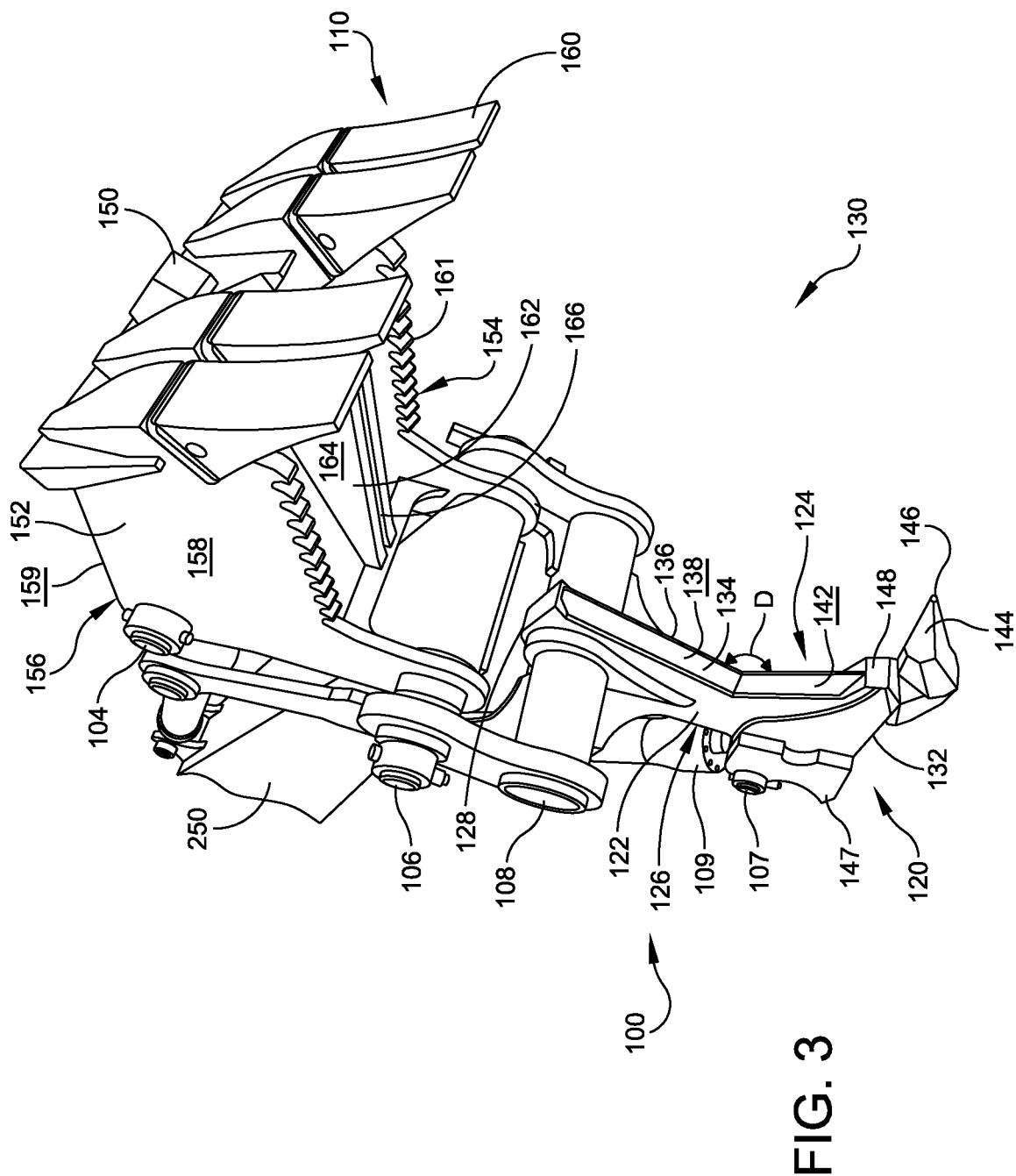
FIG. 3 illustrates a right perspective view of the stump harvester of FIG. 1 in an open position.

FIGS. 2-3 illustrate left and right perspective views of the stump harvester 100, respectively. In this embodiment, the stump harvester 100 may include a front jaw assembly 110 that is pivotally coupled with a back jaw assembly 120 via the second pin 106, as well as a steel torque tube 108 designed and sized to eliminate jaw twist in the back jaw assembly 120 when subjected to high forces.

Figure 4:
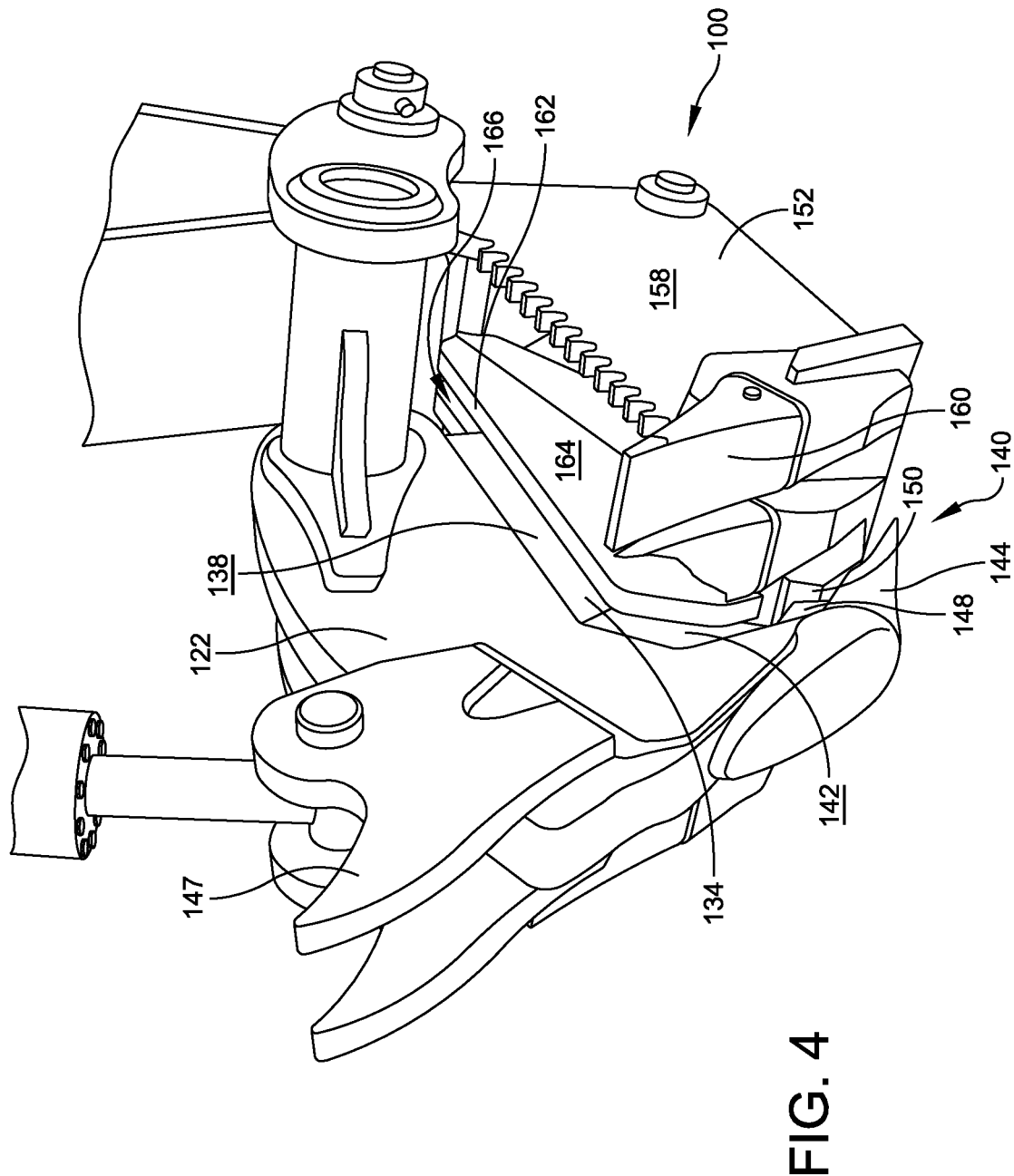
FIG. 4 illustrates a right perspective, cut-away view of the stump harvester of FIG. 1 in a closed position.

The pivotal or rotational coupling of the front and the back jaw assemblies 110, 120 may be configured to facilitate movement of the jaw assemblies between an open position, shown in FIGS. 2-3, in which the front and the back jaw assemblies 110, 120 are hinged apart (e.g., in a position to be disposed about a stump or other tree materials) and a closed position 140, shown in FIG. 4, in which the front and the back jaw assemblies 110, 120 are fully hinged together (e.g., in which the stump or other tree materials have been severed). Operating the harvester 110 to move the jaw assemblies 110, 120 between the open and the closed positions 130, 140 is detailed further below.

The front jaw and the back jaw assemblies 110, 120 may be maneuvered by actuating the rotative coupling between the two jaws in any appropriate manner that rotates the jaw assemblies from the open position 130, to the closed position 140, and to any position therebetween. Generally, the front jaw assembly 110 may be actuated via a hydraulic arm 252 incorporated into a distal end of the excavator arm 250 of the excavator 200 (FIG. 2). In one embodiment, the back jaw assembly 120 may be passive and maintained in a stiff position by a rigid brace or solid steel strut (not shown) attached between the back jaw assembly 120 and the excavation arm 250. The brace may be secured in a three-position bracket to an underside of the excavation arm 250 to provide ultra-strong adjustment. Alternatively, and similar to the actuation of the front jaw assembly 110, the back jaw assembly 120 may be powered hydraulically via a hydraulic cylinder 109 attached between the back jaw assembly 110 and the excavation arm 250. In one embodiment, the hydraulic cylinder 109 may utilize a heavy duty, five-thousand psi cylinder to maneuver the back jaw assembly 120 between the open and the closed positions 130, 140. The passive brace or the hydraulic cylinder 109 may be mounted to the back jaw assembly 120 using an oversized pin 107 located on a lower heel of the back jaw assembly 120.

Turning to the mechanics of the jaw assemblies, one embodiment of the back jaw assembly 120 may include a knife arm 122. The knife arm 122 may have a front or leading side 124, which faces the front jaw assembly 110 in the direction of arrow A, and a trailing or back side 126, which faces opposite the front jaw assembly 110, also opposite the direction of arrow A. The knife arm 122 may also include a proximal end 128 disposed adjacent the excavator arm 250 and a distal end 132 that is offset from the excavator arm 250 when the harvester 100 is attached to the excavator 200. The knife arm 122 may be formed of extra thick QT100 alloy steel that is hard faced on the front or leading side 124.

A cutting blade 134 may be disposed along the front side of the knife arm 122, such that the cutting blade 134 terminates in a sharpened cutting edge 136 that extends toward the front jaw assembly 110. The cutting blade 134 may cover a majority or an entirety of the front side 124 of the knife arm 122 between the proximal and the distal ends 128, 132 of the knife arm 122. In one embodiment, the cutting blade 134 extends over at least 70-90 percent of the front side 124 of the knife arm 122 between the proximal end 128 and the distal end 132. This extensive coverage enables to the harvester 100 to engage with stumpage and/or tree materials disposed between the front and the rear jaw assemblies 110, 120 regardless of any particular placement of the jaws 110, 120 about the material or the "aim" of the harvester 100. This configuration renders the harvester fiercely productive in that less precise positioning, and thus less operator control time and positioning repetition, are required for effective operation and engagement with the desired materials.

The cutting blade 134 may form any appropriate and/or desired planar shape. In one embodiment, the cutting blade may include two jointed blade portions. In this embodiment, the cutting blade 134 may include jointed proximal and distal sections 138, 142 that form an obtuse angle, D, therebetween, as shown in FIGS. 2-3. The angle, D, may be approximately 118 degrees. In other embodiments, the cutting blade 134 may form an arch, a parabolic shape, or any other appropriate profile or shape using any appropriate number of blade portions.

The cutting edge 136 of the blade 134 may be formed of AR500 steel. As shown in the cross-sectional view of FIG. 5, the cutting blade 134/cutting edge 136 may feature a sharpened, tapered, dual-bevel cross-sectional geometry that is, in one embodiment, manufactured using a three-dimensional CNC profile. The cutting edge 136 and the cutting blade 134 may be bisected by a centerline plane, C, that serves as a symmetrical center plane for the stump harvester assembly 100, as discussed in greater detail below with respect to the alignment of other assembly components.

In this embodiment, the back jaw assembly 120 may also include a splitter fang 144 that is disposed at the distal end 132 of the knife arm 122, directly below, in line with, and planer to the cutting blade 134. The splitter fang 144 may extend toward the front jaw assembly 110 and culminate in a piercing tip 146 that is bisected by the centerline plane, C, that also bisects the cutting edge 136 of the cutting blade 134, shown in FIG. 5. This planar alignment between the cutting blade 134/cutting edge 136 and the splitter fang 144 further enables productivity of the back jaw assembly 120 of the stump harvester 100, in that it provides an optimal geometry for efficient tree and stump splitting both radially across and axially with the wood grain. In one embodiment, the splitter fang 144 may be oriented at an obtuse angle of approximately 122 degrees relative to the distal section 142 of the cutting blade 134.

Both the cutting blade 134 and the splitter fang 144 may be removably attached to the back jaw assembly 120 in any appropriate manner. Thus, the components may be removed for sharpening, repair, and/or replacement as needed. The replaceable nature of the cutting blade 134 and the splitter fang 144 increases the longevity of the stump harvester 100. Rather than replacing or refurbishing the entirety of the harvester 100 when components dull or are otherwise compromised, these individual parts may be removed and either serviced and reaffixed or replaced entirely.

The back jaw assembly 120 may further include rhino-type horn 147 mounted to the back side 126 of the knife arm 122 for the purpose of ripping, flipping, dragging, and/or back-dragging ground, stump, and tree debris. The rhino horn 147 may also be used for side-sweeping the worksite floor.

To facilitate efficient operation that does not prematurely wear the cutting blade 136, the knife arm 122 may also incorporate a back positive stop 148 positioned at the distal end 132 of the front side 124 of the knife arm 122 between the cutting blade 134 and the splitter fang 144. The back positive stop 148 may physically interact or collide with a corresponding front positive stop 150 positioned on the front jaw assembly 110 to ensure proper movement of the jaw assemblies 110, 120 between the open and the closed positions 130, 140, as detailed further below.

Turning to the front jaw assembly 110, which opposes and is pivotally coupled with the back jaw assembly 120, one embodiment may include a grubbing arm 152 having a back side 154 facing the back jaw assembly 120, a front side 156 facing the front of the harvester 100 opposite the back jaw assembly 120, two solid side plates 158, and a front plate 159. In this embodiment, the side plates 158 and the front plate 159 may each feature a solid geometry configured to push, move, and/or sweep earth and/or other debris when the harvester 100 is swept along the ground, facilitating worksite cleanup and side-sweep grading and compaction around and within the extraction hole crated by the removal of a stump. The side and front plates 158, 159 may be formed of extra thick (based on carrier weight class) QT100 alloy steel. Further, each of the side plates 158 may feature a serrated edge 161 that assists in locking, gripping, and controlling the stump or log during the splitting, shearing, and/or the cross-cutting processes.

In one embodiment, at least four replaceable prying tines 160, also called digging points or teeth, ground-engaging points, or prying points, may extend rearward from the back side 154 of the grubbing arm 152 toward the splitter fang 144 on the knife arm 122. The prying points may be oriented at an obtuse angle of approximately 118 degrees relative to the back side 154 of the grubbing arm 152. In this embodiment, the prying tines 160 may be symmetric about the centerline plane, C, discussed above, which bisects the harvester 100 down a center of the cutting edge 136 and the splitter fang 144. The prying tines 160 may function to rip, pry, and dig during the excavation process. They also work in conjunction with the splitter fang 144 in radially splitting tree lengths or logs lengthwise.

The front jaw assembly 110 may also include a dual anvil 162 that extends rearward from the grubbing arm 152 toward the back jaw assembly 120. In this embodiment, the dual anvil 162 may include two anvil walls 164 separated by an anvil channel 166. The anvil walls 164 and the anvil channel 166 may be symmetrically positioned about the centerline plane, C, such that the anvil channel 166 is bisected by the centerline plane, C, in planar alignment with the cutting edge 136 of the cutting blade 134.

Figure 5:
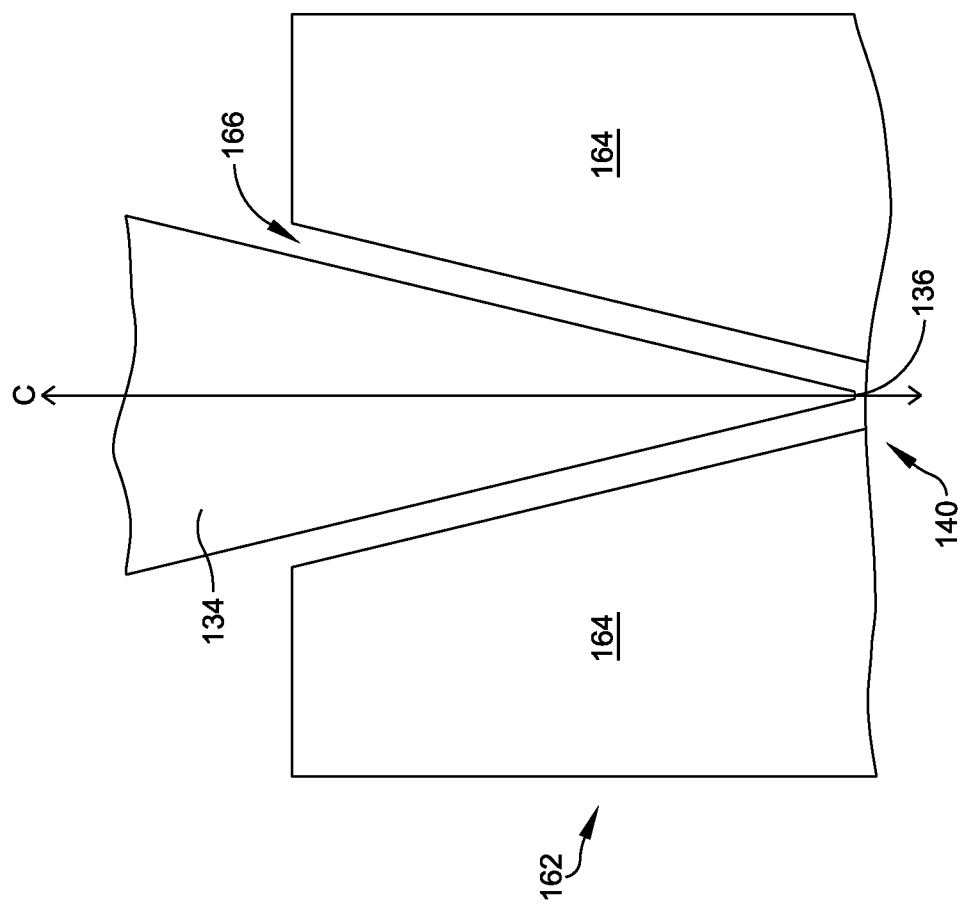
FIG. 5 illustrates a cross-sectional view of a cutting blade sheathed within a dual anvil of the of stump harvester of FIG. 1, where the stump harvester is in the closed position of FIG. 4.

FIG. 5 illustrates a cross-sectional view of the cutting blade 134 received within the dual anvil 162 when the jaw assemblies 110, 120 are pivoted into the closed position 140. To protect the blade edge 136 during the shearing movement, one embodiment of the opposing anvil walls 164 may form the anvil channel 166 with a v-shaped profile that mirrors a profile of the dual-bevel cutting blade 134. When the front and the back jaw assemblies 110, 120 are pivoted into the closed position 140 such that the back positive stop 148 located on the knife arm 122 collides or meets with the front positive stop 150 located on the grubbing arm 152, as shown in FIG. 4, the anvil channel 166 receives, sheaths, or envelops the cutting edge 136 of the cutting blade 134, as shown in FIG. 5.

The anvil channel 166 may be identical in width, slightly narrower, or slightly wider (FIG. 5) than the cutting blade 134, and the anvil walls 164 may take any appropriate shape, so long as the dual anvil 162 sheaths the blade 134 in a manner that protects the cutting edge 136 from distorting, blunting, or "mushrooming" against any other component surface when the jaw assemblies 110, 120 move into the closed position 140. That is, by leveraging the anvil channel 166, the dual anvil 162 sleeves the cutting blade 134 when the front and the back jaw assemblies 110, 120 are closed about a stump or other tree materials. As a result, the cutting blade 134 and its edge 136 bypass interference with other harvester components that are damaging to the blade edge 136 and come to rest at an end of the shearing movement without ever coming into flush contact with any surface other than the stumpage, tree lengths, and/or other organic material held within the jaws assemblies 110, 120 for processing. In this regard, the dual anvil 162 acts as an anvil to the wood or other organic materials contained within the jaw assemblies 110, 120, but not to the cutting blade 134 itself, which prevents wear and tear (e.g., mushrooming of the blade edge 136) to the cutting blade 134 and preserves the sharpness of the cutting edge 136. The dual anvil 162 may be formed of virtually unbreakable QT100 hardened alloy steel.

In operation, the back jaw assembly 120 and knife arm 122 act as a thumb or a clamp when the opposing front jaw assembly 110 and grubbing arm 152 are activated to close the harvester 100, or to move the front and the back jaw assemblies 110, 120 between the open and closed positions 130, 140. The following unique geometries of the harvester 100 allow the excavator operator to efficiently multitask using a single attached tool: (1) the front jaw assembly 110 using the four prying tines 160, the planar dual anvil 162, and the solid, serrated side plates 158; and (2) the back jaw assembly 120 featuring both the planar and replaceable splitter fang 140 and the planar and sharpened, dual-bevel, replaceable cutting blade 134 that extends over the majority of the front side 124 of the knife arm 122 and that extends into the opposing dual anvil offset 166 in the closed position 140.

Figure 6:
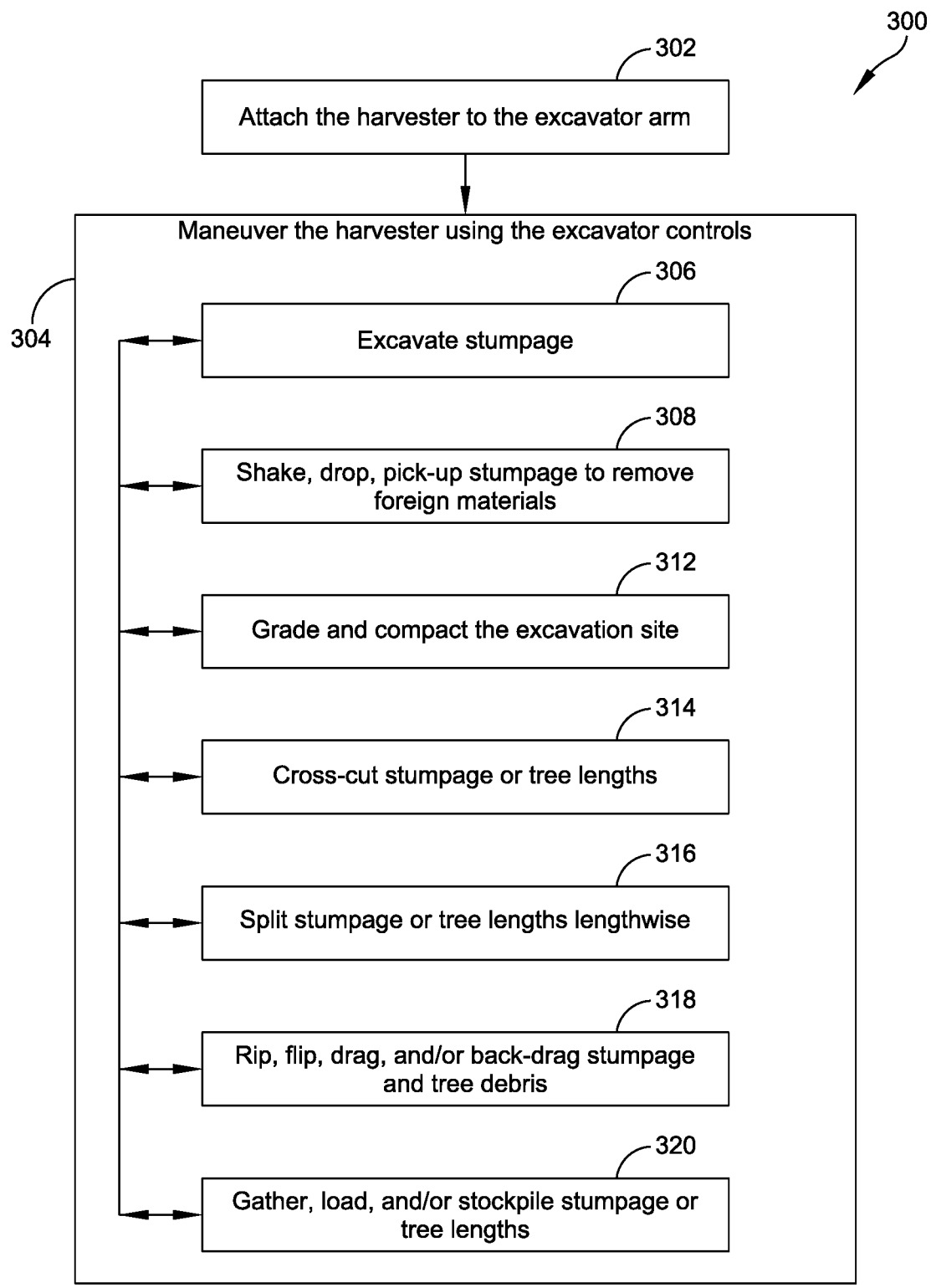
FIG. 6 provides a flowchart depicting an exemplary method of operating the stump harvester of FIG. 1.

FIG. 6 provides a flowchart depicting an exemplary method (300) of operating the harvester 100 to leverage the unique features discussed above to perform multiple different processing operations upon stumpage, logs, tree lengths, and/or other organic materials, while FIGS. 7-11 illustrate perspective views of specific steps of the method (300).

Figure 7A:
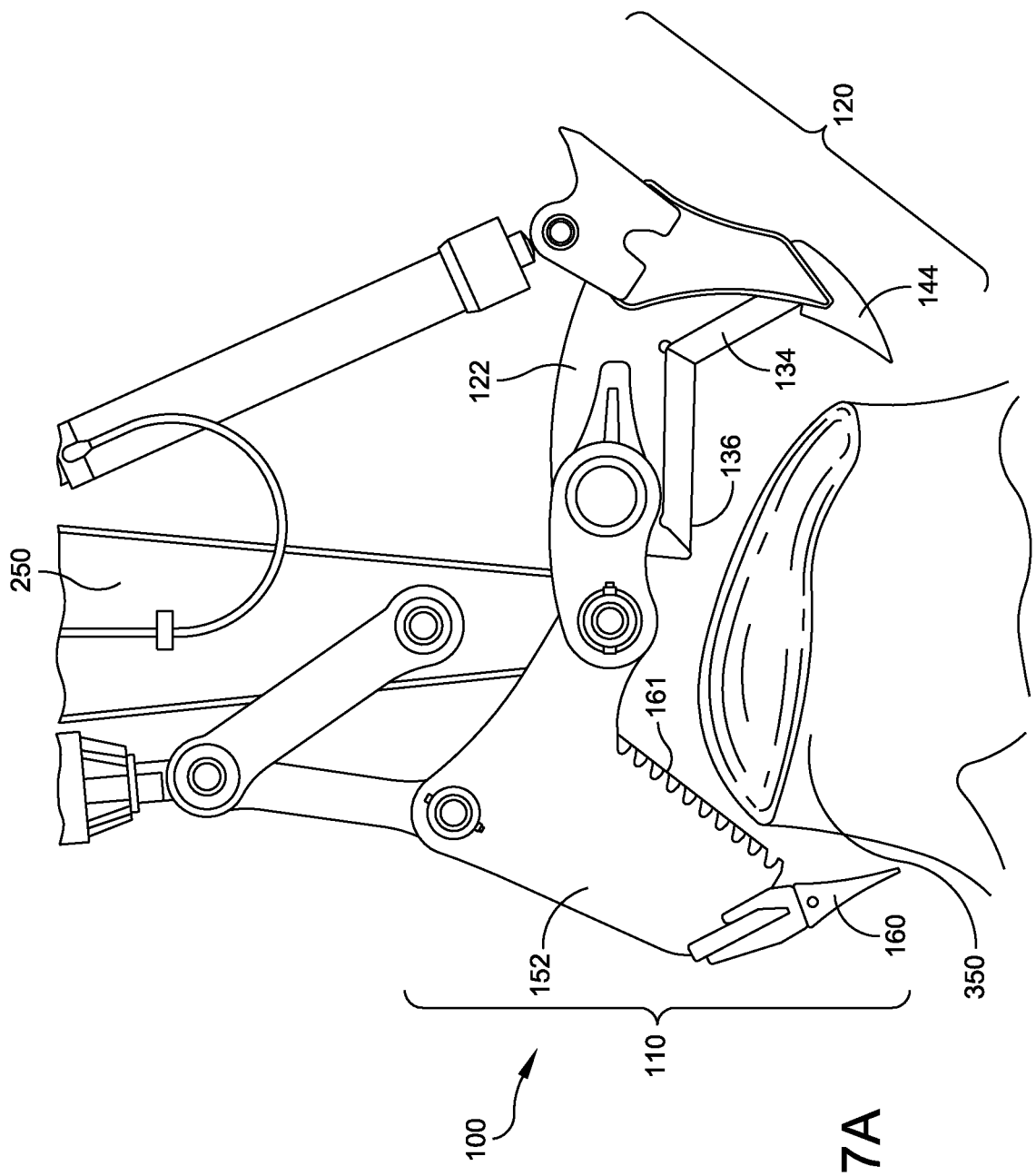
FIGS. 7A-7B illustrate perspective views of the stump harvester of FIG. 1, having front and back jaw assemblies in the open position about a tree stump for excavation.
Figure 7B:
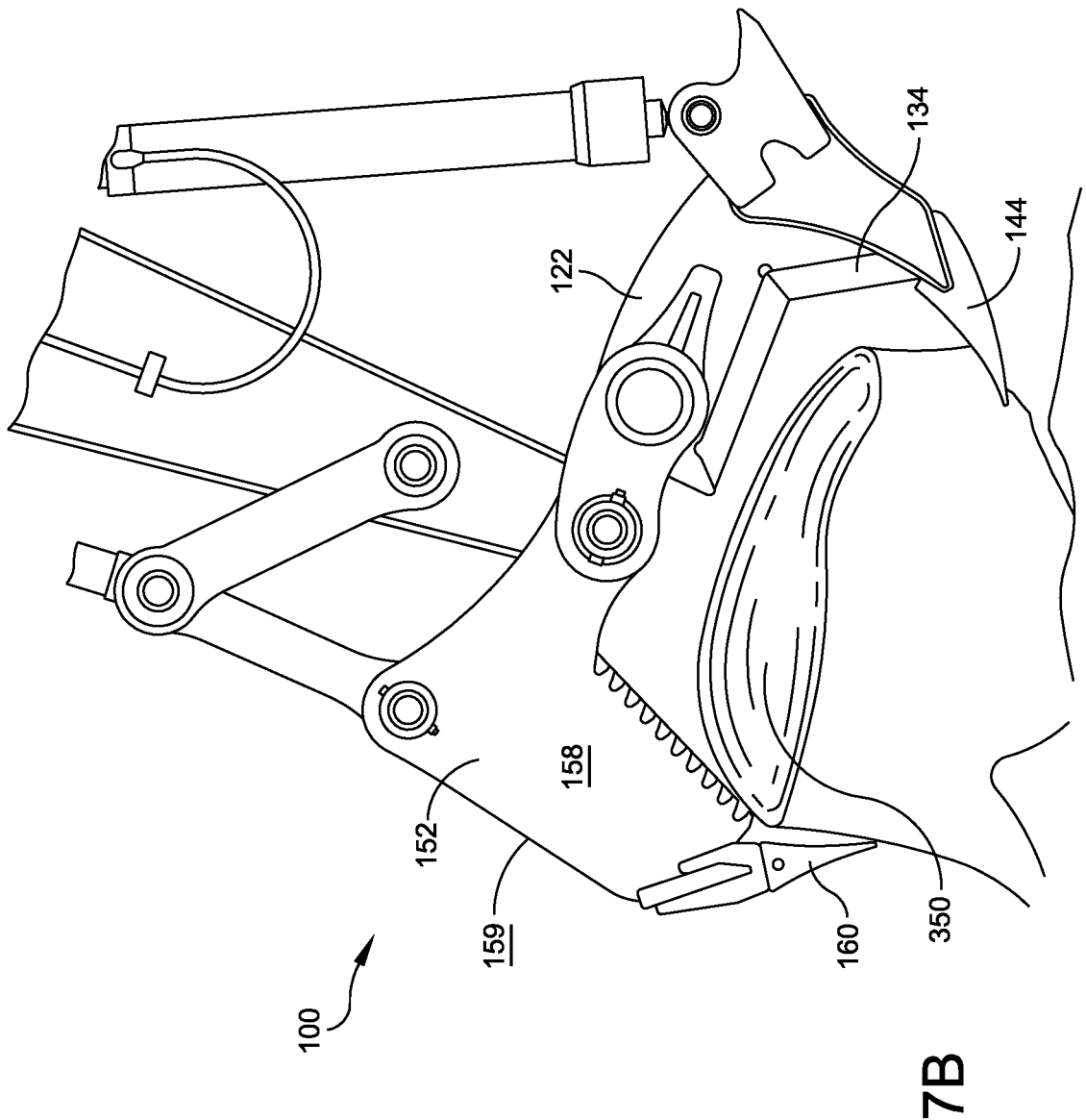
Figure 8:
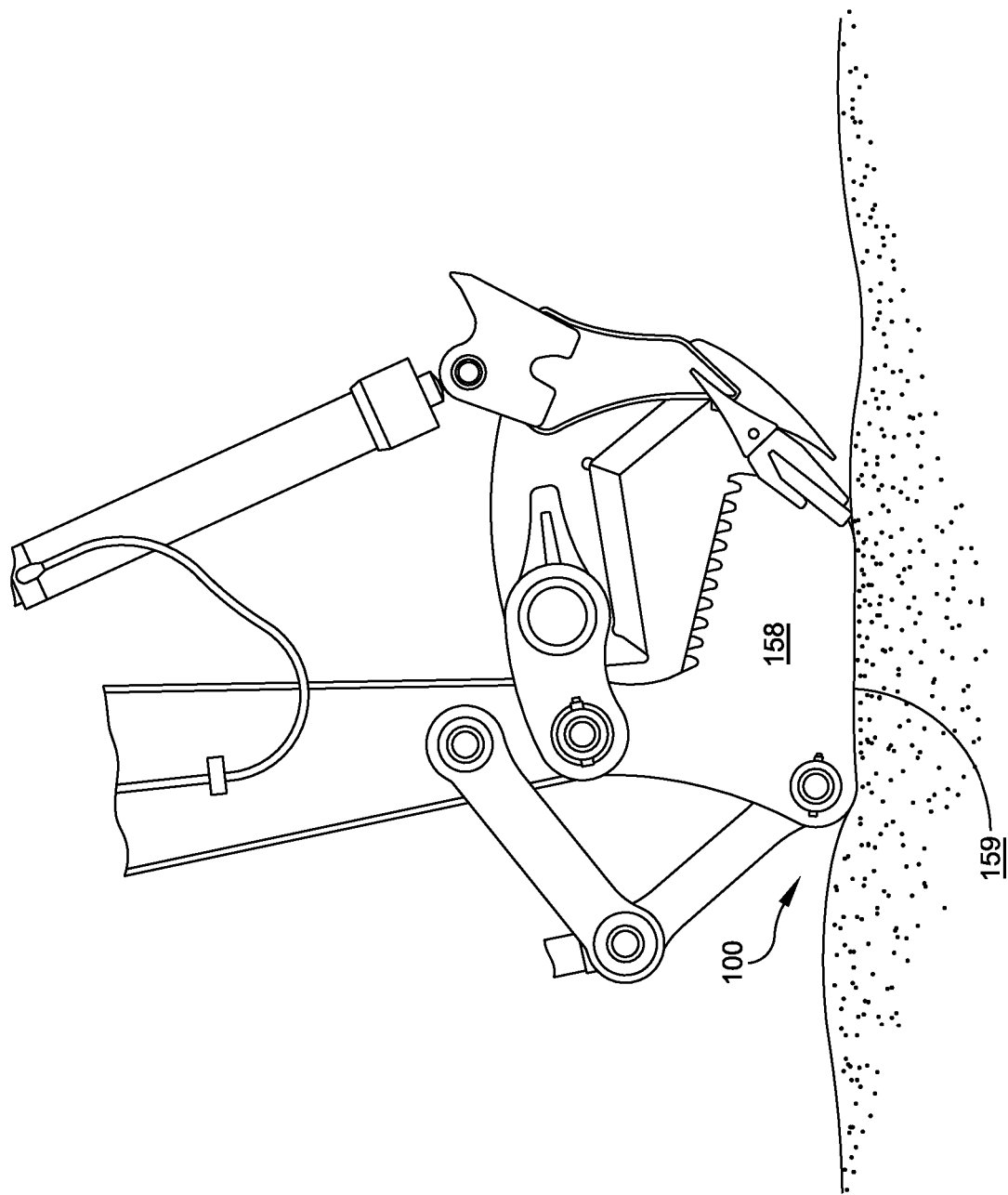
FIG. 8 illustrates a perspective view the stump harvester of FIG. 1 positioned to compact the ground at a stump excavation site.

In one embodiment, the method (300) may begin with attaching the harvester 100 to the excavator arm 250 of an excavator such as excavator 200 (302). This attachment (302) may occur in any appropriate manner, including via a quick coupler or a pin-grabber style coupling that allows the harvester 100 to be attached and enabled in a matter of seconds to minutes. Once attached, the excavator operator may employ the excavator controls to maneuver the harvester 100 (304), including rotating the front and the back jaw assemblies 110, 120 through a range of positions between the open position 130 and the closed position 140. As shown in FIGS. 7A-7B, the splitter fang 144, the prying tines 160, and the serrated edges of the side plates 161 of front and the rear jaw assemblies 110, 120 may then be used to pry or excavate a stump 350 from the ground (306) with both high speed and minimal effort. Once excavated (306), the excavator 200 may maneuver the harvester 100 to agitate (e.g., shake, drop, pick-up) the excavated stump to remove extraneous materials such as dirt, rocks, and/or other foreign objects from the load (308). In addition, and as shown in FIG. 8, the solid side and front plates 158, 159 of the harvester 100 may be side-swept along or tamped upon the ground to grade the excavation site and compact the excavation hole created by the removal of the stump 350 (312).

Figure 9:
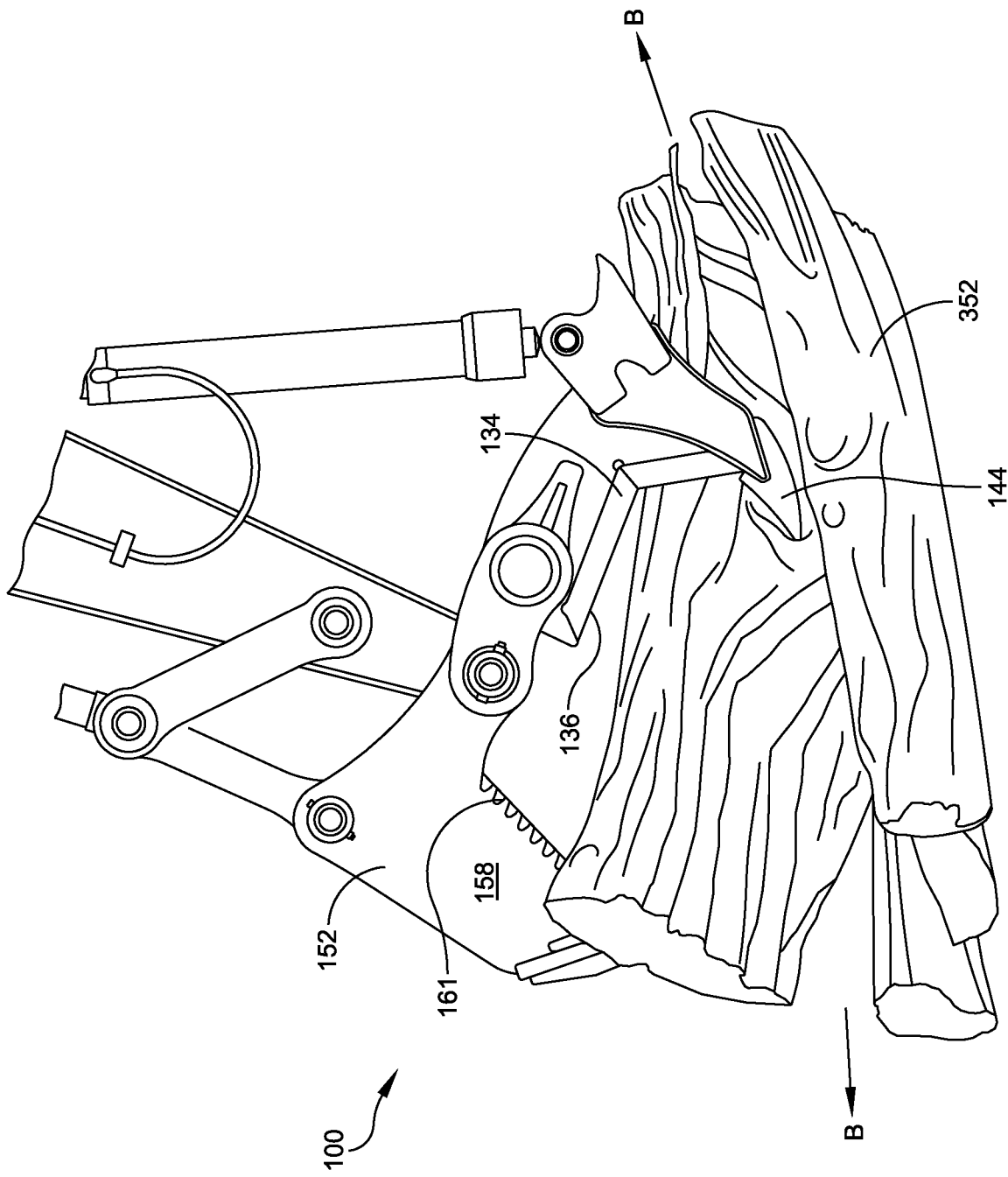
FIG. 9 illustrates a perspective view of the stump harvester of FIG. 1 positioned to radially cross-cut a tree length.
Figure 10:
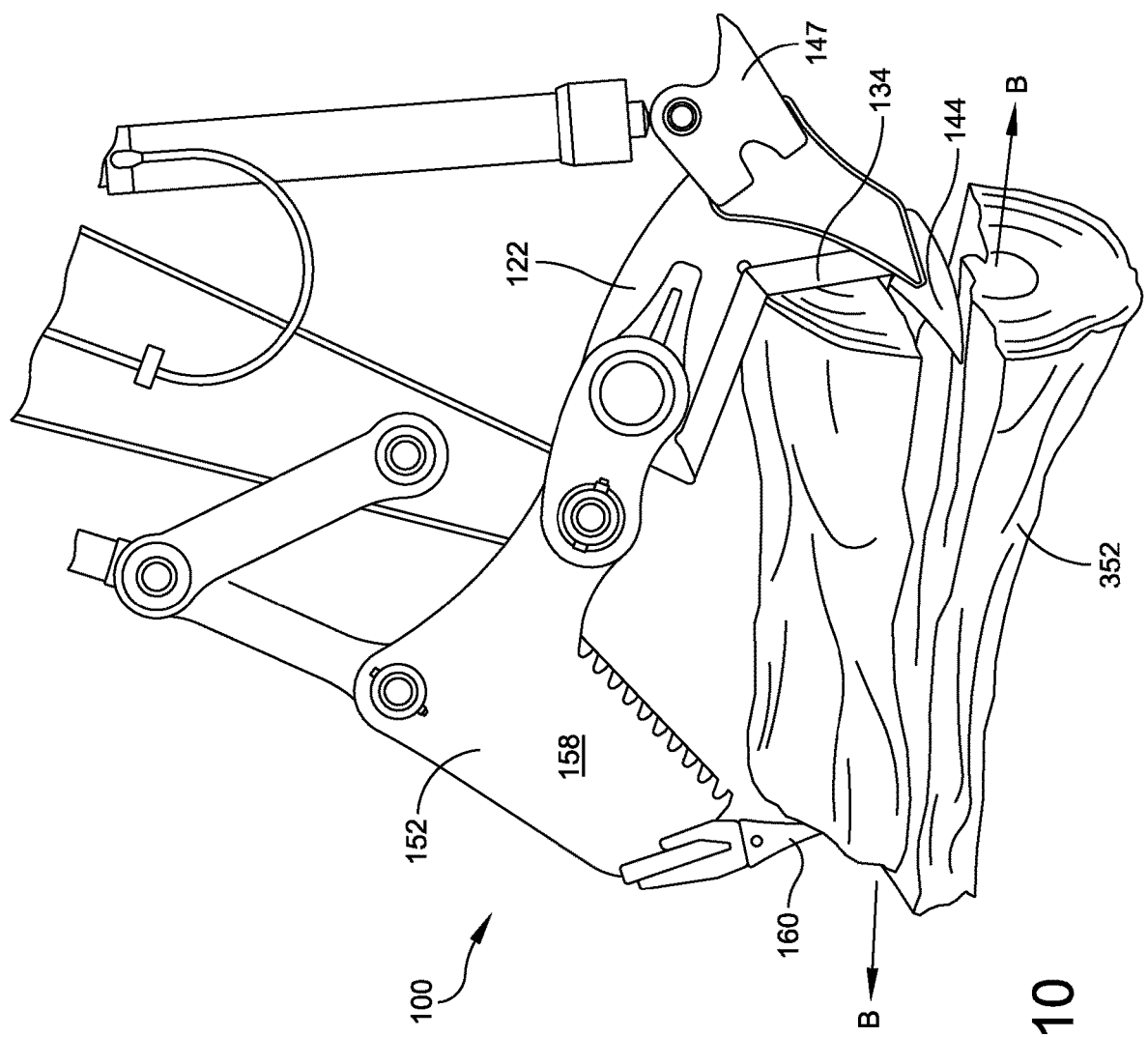
FIG. 10 illustrates a perspective view of the stump harvester of FIG. 1 positioned to axially split a tree length lengthwise.
Figure 11:
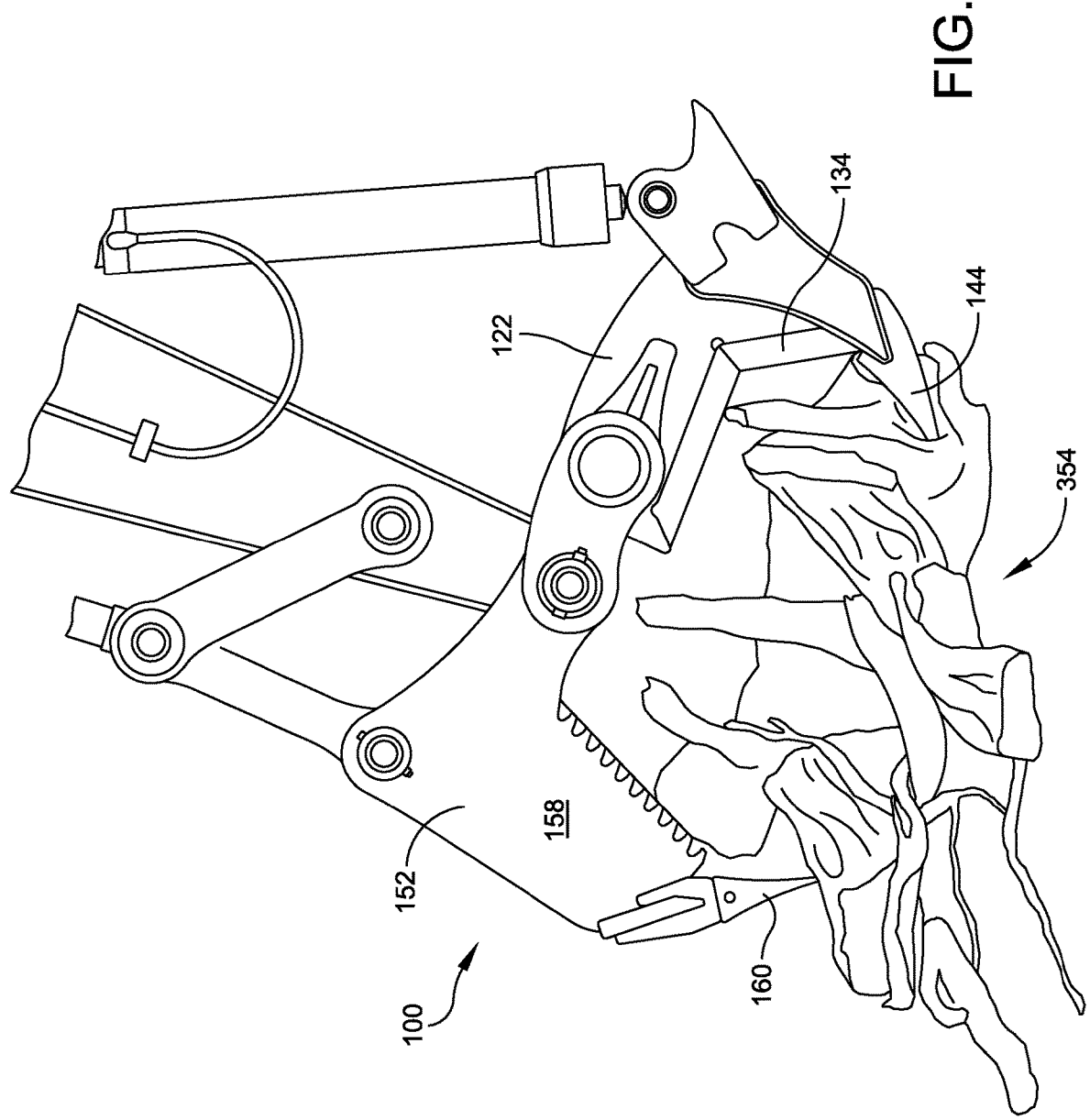
FIG. 11 illustrates a perspective view of the stump harvester of FIG. 1 positioned to gather, load, and/or stockpile stumpage, tree lengths, and other organic materials.

The harvester 100 may also be employed to cross-cut/shear/radially split the excavated stump 350 or any stump, log, or tree length 352 in a direction perpendicular to the wood grain represented by axis B (314), as shown in FIG. 9. Additionally or alternatively, the harvester 100 may be used to axially split the stump 350 or tree length 352 lengthwise along the wood grain represented by axis B (316), as shown in FIG. 10. The rhino-type horn 147 of the harvester 100 may be employed to rip, flip, drag, and/or back-drag ground, stump, and tree debris, as appropriate for clean-up or material processing (318). Because the back jaw assembly 120 acts as a clamp to retain extracted, cut, and/or split stumpage or tree material within the closed jaws of the harvester 100, the operator may also use the harvester 100 to gather and load a variety of organic material 354 into trucks or grinders or stockpile product for later handling (320), as shown in FIG. 11.

In performing the processing operations of the method (300), discussed above, the dual anvil 162 protects the cutting edge 136 of the blade 134 during the cutting and/or shearing process, in that the blade edge 136 is sheathed within the anvil channel 166 between the anvil walls 164 when the jaw assemblies 110, 120 are moved into the fully closed position 140 in which the back positive stop 148 on the knife arm 122 meets the front positive stop 150 on the grubbing arm 152, as discussed above in relation to FIGS. 4-5.

Further, the four distinct prying tines 160 opposing the splitting fang 144 allow for dispersed load bearing and management of irregular shapes, including stump anomalies, root systems, and rocks. The four prying tines 160 also serve to support a stump, log, or tree portion for radial cross-cutting and axial splitting lengthwise via the splitting fang 144, while the serrated edges 161 of the side plates 158 lock the stump, log, or tree portion into position for excavating, cutting, shearing, splitting and/or manipulating/loading.

The planar alignment and replaceable nature of the splitter fang 144, the opposing prying tines 160, and the sharpened, dual-bevel cutting blade 134 spanning the majority of the front side 124 of the knife arm 122 render the stump harvester the fastest, most productive, and efficient tool for harvesting and excavating stumpage, cleaning rock, dirt, and other debris from the stump, shearing and cross-cutting the stump, axially splitting stumpage or other tree portions, and also positioning the stump, tree portion, or other material for stockpiling and/or loading into trucks or grinders. The harvester 100 also serves as a ground cleanup tool. In this regard, rather than requiring a number of different tools to carry out the operations necessary in clearing stumpage in anticipation of road or other industrial development, the optimized harvester 100 may be employed to carry out all of the requisite operations. Using one tool rather than many for excavation, cross-cutting, splitting, ground cleanup and compaction, and loading and/or stockpiling saves abundant resources otherwise required for additional manpower and tooling accessories, as well as time required for multiple tooling changes.

In one embodiment, the components of the stump harvester 100 are custom fabricated, with the exception of the prying tines 160 on the front jaw assembly 110 and the replaceable splitter fang 144 on the back jaw assembly 120. Many components may be profiled to reduce weight.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A stump harvester for attachment to a distal end of an excavator arm, comprising:
    a front jaw assembly pivotally coupled with a back jaw assembly, the front and the back jaw assemblies configured to move between an open position in which the front and the back jaw assemblies are hinged apart and a closed position in which the front and the back jaw assemblies are hinged together, wherein:
    the back jaw assembly comprises:
        a knife arm having a front side facing the front jaw assembly, a back side facing opposite the front jaw assembly, a proximal end disposed adjacent to the excavator arm, and a distal end offset from the excavator arm;
        a cutting blade disposed along the front side of the knife arm, the cutting blade terminating in a sharpened cutting edge; and
        a back positive stop disposed adjacent the cutting blade at the distal end of the knife arm;
    the front jaw assembly comprises:
        a grubbing arm having a back side facing the back jaw assembly, a front side facing opposite the back jaw assembly, a proximal end disposed adjacent to the excavator arm, and a distal end offset from the excavator arm;
        a dual anvil extending from the grubbing arm toward the back jaw assembly, the dual anvil comprising a first anvil wall separated from a second anvil wall by an anvil channel, the dual anvil having a planar face and a base portion in opposition to one another, the planar face of the dual anvil containing the anvil channel, and the base portion of the dual anvil supported along the grubbing arm over a length corresponding to the anvil channel; and
        a front positive stop protruding from the front side of the grubbing arm;
    a centerline plane bisects the cutting edge and the anvil channel; and
    the front and the back positive stops meet at the closed position in which the cutting edge is sheathed within the anvil channel.

2. The stump harvester of claim 1, wherein a cross-sectional profile of the anvil channel mirrors a cross-sectional profile of the cutting blade.

3. The stump harvester of claim 2, wherein the cross-sectional profile of the anvil channel is wider than the cross-sectional profile of the cutting blade.

4. The stump harvester of claim 1, wherein the cutting blade extends over at least 70-90 percent of the front side of the knife arm between the proximal end and the distal end of the knife arm.

5. The stump harvester of claim 4, wherein the cutting blade comprises a jointed blade having a proximal section and a distal section, the proximal and the distal sections forming an obtuse angle therebetween.

6. The stump harvester of claim 4, wherein the cutting edge of the cutting blade comprises a dual-bevel cross-sectional geometry.

7. The stump harvester of claim 1, further comprising:
    a splitter fang disposed at the distal end of the knife arm, the splitter fang tapering to a piercing tip that extends toward the front jaw assembly; and
    a plurality of prying tines disposed at the distal end of the grubbing arm and extending toward the back jaw assembly, wherein the centerline plane bisects the piercing tip and the plurality of the prying tines.

8. The stump harvester of claim 7, wherein the cutting blade and the splitter fang are removably attached to the knife arm.

9. The stump harvester of claim 1, wherein the cutting blade is formed of AR500 steel.

10. The stump harvester of claim 1, wherein the grubbing arm comprises a front plate disposed at the front side of the grubbing arm, the front plate joining two side plates that extend between the front side and the back side of the grubbing arm, and wherein the front plate and the two side plates each comprise a solid geometry.

11. A method of operating a stump harvester having a front jaw assembly coupled with a back jaw assembly via a rotative coupling, wherein:
    the front jaw assembly includes a grubbing arm, a front positive stop, a plurality of prying tines that extend outward from the grubbing arm toward the back jaw assembly, and a dual anvil having two opposing walls that extend outward from the grubbing arm toward the back jaw assembly, the two opposing walls separated by an anvil channel, the dual anvil having a planar face and a base portion in opposition to one another, the planar face of the dual anvil containing the anvil channel, and the base portion of the dual anvil supported along the grubbing arm over a length corresponding to the anvil channel;

the back jaw assembly includes a knife arm, a back positive stop, a cutting blade having a cutting edge that extends outward from the knife arm toward the dual anvil, and a splitter fang that extends outward from a distal end of the knife arm toward the plurality of the prying tines; and a centerline plane bisects the dual anvil channel, the plurality of the prying tines, the cutting edge, and the splitter fang, the method comprising:

attaching the stump harvester to a distal end of an excavator arm;

actuating the rotative coupling to rotate the front and the back jaw assemblies into an open position in which the knife arm and the grubber arm are separated;

actuating the excavator arm to dispose the front and the back jaw assemblies about a tree stump;

actuating the rotative coupling to rotate the front and the back jaw assemblies toward a closed position until the front and the back jaw assemblies tighten about the tree stump;

actuating the excavator arm and the rotative coupling to excavate the tree stump from a ground surface; and actuating the excavator arm to agitate the tree stump contained within the front and the back jaw assemblies to remove one or more foreign particles from the excavated tree stump.

12. The method of claim 11, wherein the grubbing arm comprises a front plate extending orthogonally between left and right side plates, and wherein each the front, the left side, and the right side plates has a solid geometry, the method further comprising:

actuating the excavator arm to tamp the front plate against the ground surface to compact an excavation site of the tree stump; and actuating the excavator arm to side-sweep the left and the right side plates along the ground surface to grade the ground surface.

13. The method of claim 12, wherein the cutting blade lines at least 70-90 percent of a front side of the knife arm, the method further comprising:

actuating the rotative coupling to position the dual anvil on a first radial side of a tree length and the cutting blade on a second radial side of the tree length; and actuating the rotative coupling to move the first and the second jaw assemblies into a closed position in which front and the back positive stops collide and the cutting blade is sheathed within the anvil channel such that the cutting edge is offset from the front plate of the grubbing arm, thereby radially cross-cutting the tree length.

14. The method of claim 13, further comprising:

actuating the rotative coupling to position the plurality of the prying tines at a first longitudinal end of the tree length and the splitter fang at a second longitudinal end of the tree length; and actuating the rotative coupling to move the first and the second jaw assemblies into the closed position, thereby axially splitting the tree length lengthwise along a longitudinal axis of the tree length.

15. The method of claim 14, further comprising:

removing one or more of the cutting blade and the splitter fang; and replacing the one or more of the cutting blade and the splitter fang with one or more of a replacement cutting blade and a replacement splitter fang, respectively.

\* \* \* \* \*